United States Patent
Mullet et al.

(10) Patent No.: US 6,401,792 B1
(45) Date of Patent: *Jun. 11, 2002

(54) MOTORIZED OPERATOR FOR DOORS

(75) Inventors: Willis J. Mullet, Pensacola Beach; Yan Rodriguez; Scott A. Slavik, both of Pace, all of FL (US)

(73) Assignee: Wayne-Dalton Corp., Mt. Hope, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/324,995

(22) Filed: Jun. 2, 1999

Related U.S. Application Data

(63) Continuation of application No. 08/892,981, filed on Jul. 15, 1997, now Pat. No. 5,931,212.

(51) Int. Cl.[7] .............................................. E05F 11/00
(52) U.S. Cl. .......................... 160/188; 160/189; 49/199
(58) Field of Search .................................. 160/188, 189, 160/191, 201; 49/197, 199, 200, 360, 139; 74/625, 321, 340, 342, 362; 16/198, 191

(56) References Cited

U.S. PATENT DOCUMENTS

| 1,941,574 A | 1/1934 | Nichols ........................ 268/30 |
| 2,099,191 A | 11/1937 | Blodgett ........................ 20/20 |
| 3,113,471 A | 12/1963 | Gregory ........................ 74/701 |
| 3,603,177 A | 9/1971 | Burrows ........................ 74/745 |
| 3,635,277 A | 1/1972 | Bahnsen ...................... 160/191 |
| 4,047,441 A | 9/1977 | Kellogg ......................... 74/52 |
| 4,460,030 A | 7/1984 | Tsunemura et al. ........... 160/35 |
| 4,472,910 A | 9/1984 | Iha .............................. 49/139 |
| 4,497,220 A | 2/1985 | Grinde ........................ 74/792 |
| 4,611,504 A | 9/1986 | Rundle ....................... 74/695 |
| 4,706,727 A | 11/1987 | Leivenzon et al. ......... 160/188 |

(List continued on next page.)

FOREIGN PATENT DOCUMENTS

| DE | 33 31 211 A1 | 3/1984 | ........... E05F/15/10 |
| DE | G 90 16 317.6 | 5/1992 | ............. E05F/1/00 |
| FR | 2 653 485 | 10/1989 | ........... E05D/15/38 |

OTHER PUBLICATIONS

"Architectural Graphic Standards",The American Institute Of Architects, Eighth Edition, Copyright 1988 by John Wiley & Sons, Inc., p. 403 entitled "Commercial Overhead Door Operators".

Primary Examiner—Bruce A. Lev
(74) Attorney, Agent, or Firm—Renner, Kenner, Greive, Bobak, Taylor & Weber

(57) ABSTRACT

An operating system for controllably moving in upward and downward directions a sectional door (D) in relation to a door frame (12) having a pair of jambs (13, 14) and an interconnecting header (15), including a counterbalancing system (30) having a drive tube (31) interconnected with the sectional door proximate the ends thereof, a resonible motorized operator (10) mounted adjacent to the drive tube and between the ends of the sectional door, and a drive train (70) interconnecting the drive tube and the motorized operator for selectively driving the sectional door in upward and downward directions. The operator includes a motor (40) for selectively rotating a drive shaft (60) in two directions, a drive wheel (80) on the drive shaft for rotating the drive train in one direction when the motor rotates the drive shaft in one direction, and a coupler on the drive shaft rotating the drive wheel when located in a first position and directly engaging and rotating the drive gear in the other direction when located in a second position.

9 Claims, 7 Drawing Sheets

U.S. PATENT DOCUMENTS

| | | |
|---|---|---|
| 4,732,203 A | 3/1988 | Alten .......................... 160/188 |
| 4,800,769 A | 1/1989 | Rietsch ........................ 74/322 |
| 4,893,557 A | 1/1990 | Benthake et al. ............ 101/141 |
| 5,036,899 A | 8/1991 | Mullet ......................... 160/189 |
| 5,139,075 A | 8/1992 | Desrochers ................. 160/310 |
| 5,419,010 A | 5/1995 | Mullet .......................... 16/198 |
| 5,557,887 A | 9/1996 | Fellows et al. ................. 49/28 |
| 5,584,331 A | 12/1996 | Lin ............................ 160/172 |
| 5,632,063 A | 5/1997 | Carper et al. .................. 16/198 |
| 5,698,073 A | 12/1997 | Vincenzi ..................... 160/188 |
| 5,931,212 A * | 8/1999 | Mullet et al. ................ 160/188 |

* cited by examiner

MOTORIZED OPERATOR FOR DOORS

This application is a continuation of U.S. Ser. No. 08/892,981 filed on Jul. 15, 1997 now U.S. Pat. No. 5,931,212.

TECHNICAL FIELD

The present invention relates generally to operators for doors. More particularly, the present invention relates to power-driven operators for opening and closing doors. More specifically, the present invention relates to a motor-driven operator for driving and controlling a door, such as a sectional overhead garage door, during its operating cycle, including opening and closing movements.

BACKGROUND ART

Motorized apparatus for opening and closing sectional overhead doors has long been known in the art. These powered door operators developed in part due to extremely large, heavy commercial doors for industrial buildings, warehouses, and the like where opening and closing of the doors essentially mandates power assistance. Later, homeowners' demands for the convenience and safety of door operators resulted in an extremely large market for powered door operators for residential usage.

The vast majority of motorized operators for residential garage doors employ a trolley-type system that applies force to a section of the door for powering it between the open and closed positions. Another type of motorized operator is known as a "jack-shaft" operator, which is used virtually exclusively in commercial applications and is so named by virtue of similarities with transmission devices where the power or drive shaft is parallel to the driven shaft, with the transfer of power occurring mechanically as by gears, belts, or chains between the drive shaft and a driven shaft controlling door position. While some efforts have been made to configure hydraulically or pneumatically-driven operators, such efforts have not achieved any substantial extent of commercial acceptance.

The well-known trolley-type door operators are normally connected directly to the top section of a garage door and for universal application may be powered to operate doors of vastly different size and weight, even with little or no assistance from a counterbalance system for the door. Since the operating force capability of trolley-type operators is normally very high, force adjustments are normally necessary and provided to allow for varying conditions and to allow the operator to be tuned, depending on the application. When a garage door and trolley-type operator are initially installed and both adjusted for optimum performance, the overhead door system can perform well as designed. However, as the system ages, additional friction develops in door and operator components due to loss of lubrication at rollers and hinges. Also, the door can absorb moisture and become heavier, and counterbalance springs can lose some of their original torsional force. These and similar factors can significantly alter the operating characteristics seen by the operator, which may produce erratic door operation such as stops and reversals of the door at unprogrammed locations in the operating cycle.

Rather than ascertaining and correcting the conditions affecting door performance, which is likely beyond a homeowner's capability, or engaging a qualified service person, homeowners frequently increase the force adjustment to the maximum setting. Facilitating this cause for maximum settings is the fact that the force adjustment mechanism is normally conveniently accessible outside the motor housing of trolley-type operators, and adjustment to higher force settings appears to overcome many problems. A further cause for maximum force settings originates with installers who may be paid a fixed amount per installation, such that time considerations result in a maximum force setting rather than ascertaining the reason for and correcting the condition necessitating an inordinately high force setting. Also, return service calls, at least in the short term after installation, are sometimes at the installer's expense. This may motivate an installer to adjust the operator to the maximum force setting so that such a return service call becomes less likely. However, setting an operator on a maximum force adjustment creates an unsafe condition in that the operator becomes highly insensitive to obstructions.

In the event a maximum force setting is effected on a trolley-type operator, the unsafe condition may also be dramatically exemplified in the event of a broken spring or springs. In such case, if the operator is disconnected from the door in the fully open position during an emergency or if faulty door operation is being investigated, one half or all of the uncounterbalanced weight of the door may propel the door to the closed position with a guillotine-like effect.

Another problem with trolley-type door operators is that they do not have a mechanism for automatically disengaging the drive system from the door if the door encounters an obstruction. This necessitates the considerable effort and cost which has been put into developing a variety of ways, such as sensors and encoders, to signal the operator controls when an obstruction is encountered. In virtually all instances, manual disconnect mechanisms between the door and operator are required to make it possible to operate the door manually in the case of power failures or fire and emergency situations where entrapment occurs and the door needs to be disconnected from the operator to free an obstruction. These mechanical disconnects, when coupled with a maximum force setting adjustment of the operator, can readily exert a force on a person or object which may be sufficiently high to bind the disconnect mechanism and render it difficult, if not impossible, to actuate.

In addition to the serious operational deficiencies noted above, manual disconnects, which are normally a rope with a handle, must extend within six feet of the floor to permit grasping and actuation by a person. In the case of a garage opening for a single car, the centrally-located manual disconnect rope and handle, in being positioned medially, can catch on a vehicle during door movement or be difficult to reach due to its positioning over a vehicle located in the garage. Trolley-type door operators raise a host of peripheral problems due to the necessity for mounting the operator to the ceiling or other structure substantially medially of and to the rear of the sectional door in the fully open position.

Operationally, precise alignment is also essential because the connecting arm of the operator is attached directly to the door and thus transmits forces to the door, totally independent of the counterbalance system. In the event of misalignment, the door can readily bind, thereby necessitating frequent adjustment or an undesirable increase in the force adjustment on the operator. It will thus be appreciated that the wider the door, the more significant a misalignment becomes. Further, if an overhead beam or other obstruction is located centrally of the door where an operator would normally be mounted, the off-center mounting of an operator requires added care in terms of compensation in the counterbalance system adjustment, not to mention the increased probability of developing misalignment which must be frequently corrected.

The position of the trolley above the door frequently results in essential lubricant and collected dirt being discharged to fall on the outside face of the door or the floor of a garage. Due to the required positioning of the motor unit of a trolley-type operator as described above, the necessity for mounting the motor housing in a position centrally of the garage and behind the door presents additional ancillary problems. Typically, the motor housing is mounted on perforated angle irons which are in turn mounted by a plurality of screws to the garage ceiling, which normally consists of sheetrock, plastering, or the like. The radial force vectors on the screws occasioned by reaction on the drive motor to door movement, particularly those attendant initial movement of the door, produce a fatigue failure of the ceiling material, which eventually results in a loosening of the attachment screws. This can result in the motor and trolley track weight overcoming the residual attachment screws holding force, thus causing the entire system to fall and possibly injure persons or damage objects below. Adequate inspection and servicing of the attachment screws to avoid holding failure requires inspection and work in close proximity to the drive gears, sprockets, chains, and the like, which frequently have few or no enclosure guards, thereby presenting the possibility of serious physical injury.

Another factor associated with the manner in which trolley-type operators are mounted relates to the attachment of the end of the trolley rail in the area proximate the door header. Commonly, the mounting bracket for a torsion-spring counterbalance system is attached to a spring mounting pad, which normally takes the form of a length of 2×6 wood that is mounted at substantially the center of the door above the header. Whether an original installation or a retrofit, the bracket that attaches the end of the trolley rail to the header is normally attached to the same mounting pad. These mounting pads, which are stressed to receive the resultant torque of the torsion springs, sometimes fail as by splitting when screws are driven into the mounting pad to mount the attachment bracket at the end of the trolley rail. Since the area above the header can be accessed only with the door closed, the counterbalance torsion springs are at their maximum tension. This splitting of the spring mounting pad releases the torsion-spring bracket and results in a powerful unloading of the torsion spring, which causes the mounting bracket to rotate rapidly, thus posing the possibility of serious injury to an installer in proximity to the operator.

A further area of concern with trolley-type operators is that the high-force capability of these operators is applied to the top panel of the door. Frequently, manufacturers add additional strengthening to the top panel, despite additional cost and weight, to prevent damage if an obstruction is encountered or if the door becomes misaligned and is retarded or jams. Thus, the basic operating principle and the necessary location and interface with the door both contribute to operational, safety, and cost disadvantages.

The commercial usage of jack-shaft operators has been limited virtually exclusively to commercial applications where a large portion of the door stays in the vertical position. This occurs where a door opening may be 15, 20, or more feet in height, with only a portion of the opening being required for the ingress and egress of vehicles. These jack-shaft operators are not attached to the door but attach to a component of the counterbalance system, such as the shaft or a cable drum. Due to this type of connection to the counterbalance system, these operators require that a substantial door weight be maintained on the suspension system, as is the case where a main portion of the door is always in a vertical position. This is necessary because jack-shaft operators characteristically only drive or lift the door from the closed to the open position and rely on the weight of the door to move the door from the open to the closed position, with the suspension cables attached to the counterbalance system solely controlling the closing rate.

Such a one-way drive in a jack-shaft operator produces potential problems if the door binds or encounters an obstruction upon downward movement. In such case, the operator may continue to unload the suspension cables, such that if the door is subsequently freed or the obstruction is removed, the door is able to free-fall, with the potential of damage to the door or anything in its path. Such unloading of the suspension cables can also result in the cables coming off the cable storage drums, thus requiring substantial servicing before normal operation can be resumed.

Jack-shaft operators are normally mounted outside the tracks and may be firmly attached to a door jamb rather than suspended from the ceiling or wall above the header. While there is normally ample jamb space to the sides of a door or above the header in a commercial installation, these areas frequently have only limited space in residential garage applications. Further, the fact that the normal jack-shaft operators require much of the door to be maintained in a vertical position absolutely mitigates against their use in residential applications where the door must be capable of assuming essentially a horizontal position since, in many instances, substantially the entire height of the door opening is required for entry and departure of vehicles.

DISCLOSURE OF THE INVENTION

Therefore, an object of the present invention is to provide a motorized operator for a sectional door which is designed to be installed such that it does not require additional head room above a torsion-spring counterbalance system mounted relative to the door or side room outside the vertical tracks. Another object of the present invention is to provide such a motorized operator that does not require a mechanical disconnect between the operator and the door, yet manual operation of the door can be effected at any time that the motor is not driving the door. A further object of the present invention is to provide such a motorized operator which continually provides drag to the downward or closing motion of the door, such as to prevent free-falling of the door if a torsion spring breaks.

Another object of the present invention is to provide a motorized operator for sectional doors that eliminates the need for physical attachment to the door in that it is mounted proximate to and operates through the counterbalance system drive tube at any location along the width of the door. A further object of the present invention is to provide such a motorized operator that may serve to reduce deflection of the counterbalance drive tube to which it is directly coupled to provide prompt, direct feedback from interruptions and obstructions which may affect the door during travel. Yet a further object of the invention is to provide such an operator system wherein the door inertia does not need to be cushioned or taken into account, which allows the operator system to be quick to respond to entrapment detection, thereby preventing the operator from overrunning after an obstruction is encountered.

Still another object of the present invention is to provide a motorized operator for sectional doors that does not require trolley rails, bracing of drive components, or any elements thereof suspended from the ceiling above the header or otherwise outside the area defined by the track and door systems. Yet another object of the present invention is to provide such a motorized operator in which the number of parts is greatly reduced from conventional operators such as to provide improved reliability. Still another object of the present invention is to provide such a motor operator that requires no adjustments and that does not have any means of adjustment by a consumer, thus eliminating the possibility of adjustments being made which could adversely affect operational or safety considerations. Yet another object of the invention is to provide such a motorized operator that can be quickly and easily installed, and that has a high efficiency gear reduction system, such that the motor can be operated from a battery power source as well as from a standard household alternating current power supply.

In general, the present invention contemplates an operating system for controllably moving in upward and downward directions a sectional door in relation to a door frame having a pair of jambs and an interconnecting header, including a counterbalancing system having a drive tube interconnected with the sectional door proximate the ends thereof, a motorized operator mounted adjacent to the drive tube and between the ends of the sectional door, and a drive train interconnecting the drive tube and the motorized operator for selectively driving the sectional door in upward and downward directions.

The present invention further contemplates an operator for driving in upward and downward directions a sectional door having a counterbalancing system including a drive tube interconnected with the door, including a motor for selectively rotating a drive shaft in two directions, a drive gear mounted on the drive shaft, a driven gear mounted on the drive tube and engaging the drive gear, a drive wheel on the drive shaft for rotating the drive gear in one direction when the motor rotates the drive shaft in one direction, and a coupler on the drive shaft rotating the drive wheel when located in a first position and directly engaging and rotating the drive gear in the other direction when located in a second position.

PREFERRED EMBODIMENT FOR CARRYING OUT THE INVENTION

Figure 1:
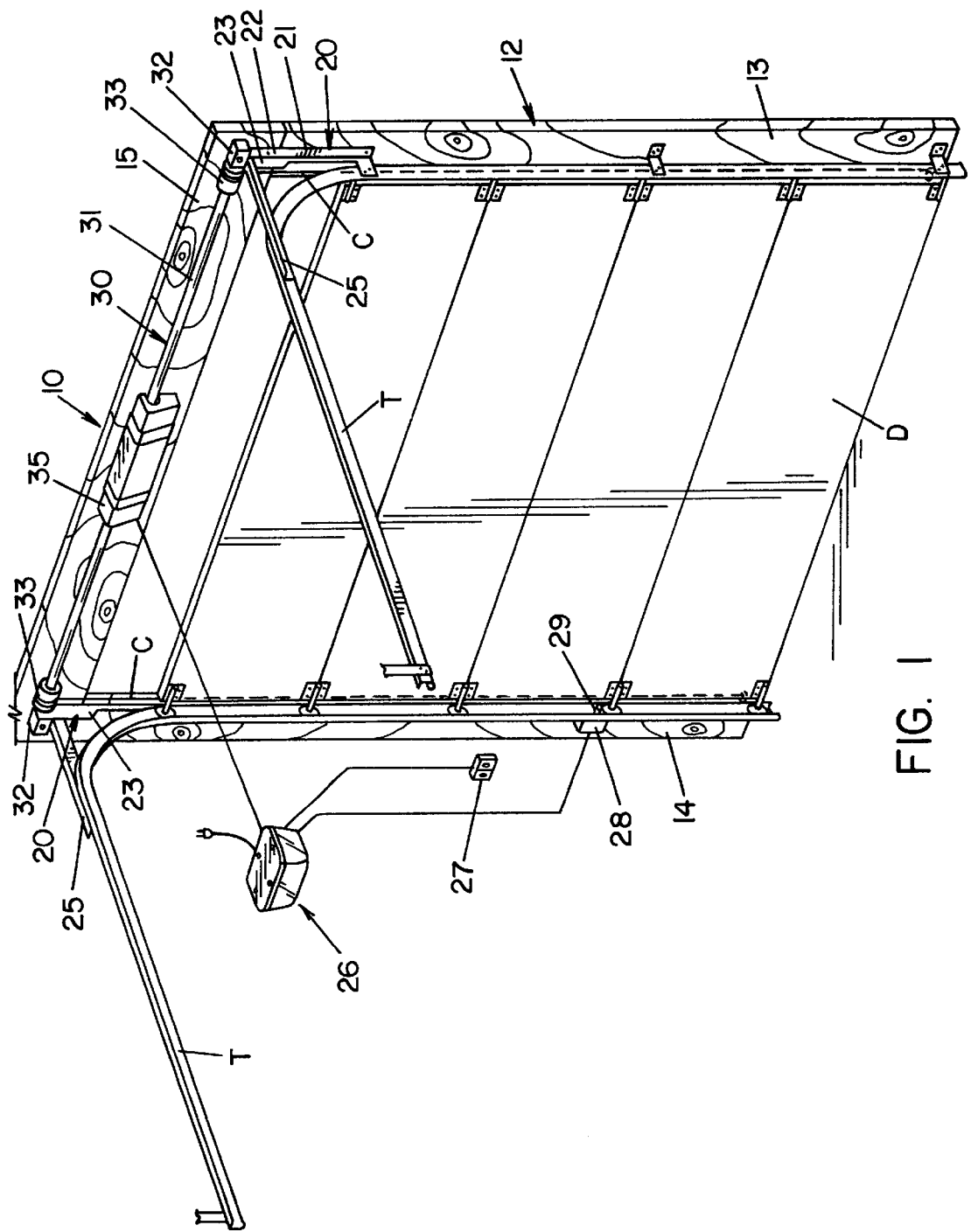
FIG. 1 is a rear perspective view of a sectional overhead garage door installation having a known torsional counterbalancing system with a motorized operator according to the concepts of the present invention installed in operative relation thereto.
Figure 2:
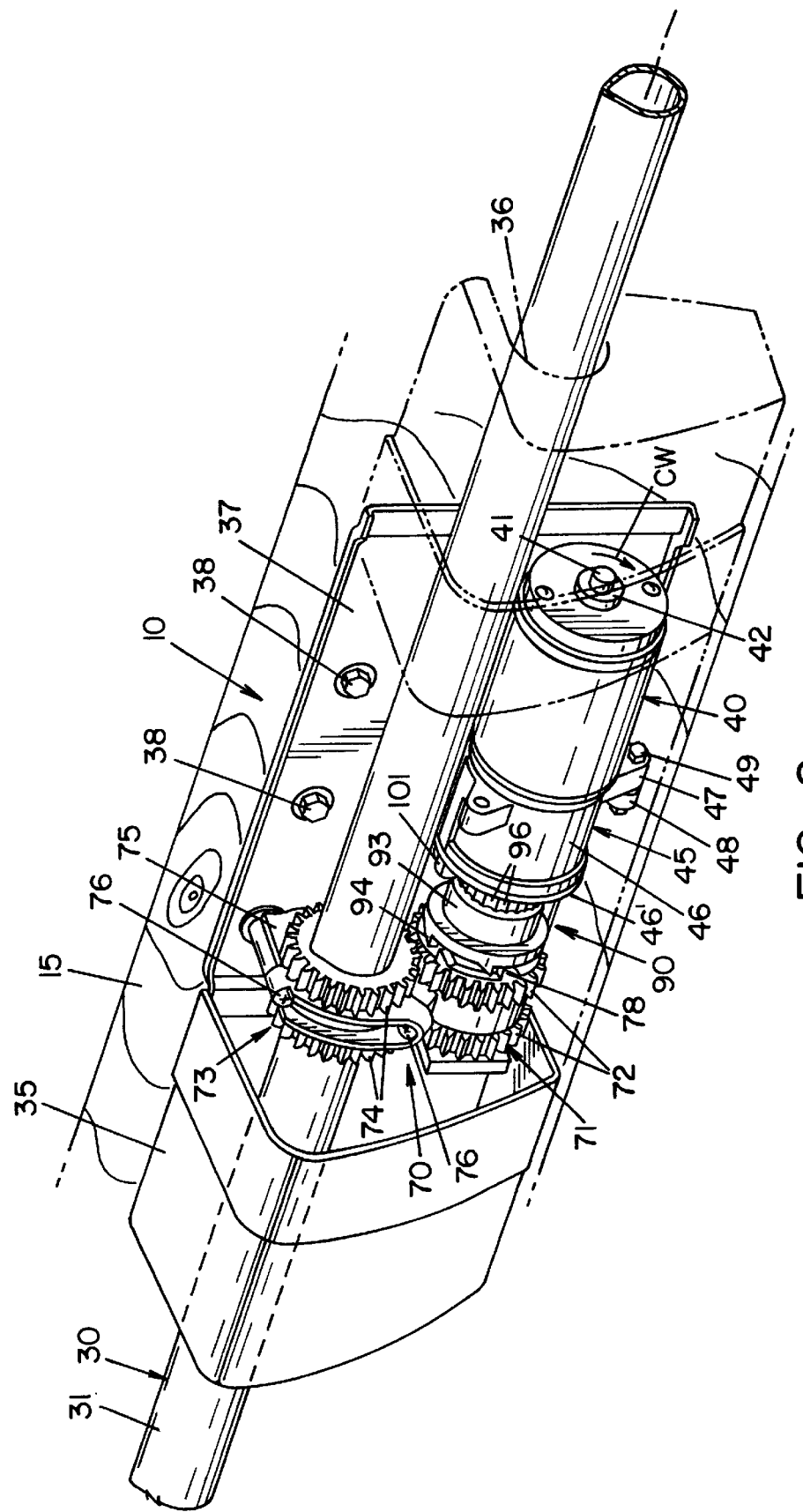
FIG. 2 is an enlarged perspective view of the motorized operator of FIG. 1 with portions of the cover broken away to show the mechanical interconnection of the motorized operator with the drive tube of the counterbalancing system.

A motorized operator according to the concepts of the present invention is generally indicated by the numeral 10 in FIGS. 1 and 2 of the drawings. The operator system 10 is shown mounted in conjunction with a conventional sectional door D of a type commonly employed in garages for residential housing. The opening in which the door D is positioned for opening and closing movements relative thereto is defined by a frame, generally indicated by the numeral 12, which consists of a pair of spaced jambs 13, 14 that, as seen in FIG. 1, are generally parallel and extend vertically upwardly from the floor (not shown). The jambs 13, 14 are spaced and joined at their vertically upper extremity by a header 15 to thereby delineate a generally inverted U-shaped frame 12 around the opening for the door D. The frame 12 is normally constructed of lumber, as is well known to persons skilled in the art, for purposes of reinforcement and facilitating the attachment of elements supporting and controlling door D, including the operator system 10.

Affixed to the jambs 13, 14 proximate the upper extremities thereof and the lateral extremities of the header 15 to either side of the door D are flag angles, generally indicated by the numeral 20. The flag angles 20 generally consist of L-shaped vertical members 21 having a leg 22 attached to an underlying jamb 13, 14 and a projecting leg 23 preferably disposed substantially perpendicular to the leg 22 and, therefore, perpendicular to the jambs 13, 14.

Flag angles 20 also include an angle iron 25 positioned in supporting relation to tracks T, T located to either side of door D. The tracks T, T provide a guide system for rollers attached to the side of door D, as is well known to persons skilled in the art. The angle irons 25 normally extend substantially perpendicular to the jambs 13, 14 and may be attached to the transitional portion of tracks T, T between the vertical section and the horizontal section thereof or in the horizontal section of tracks T, T. The tracks T, T define the travel of the door D in moving upwardly from the closed to open position and downwardly from the open to closed position.

The operator system 10 may be electrically interconnected with a ceiling unit, generally indicated by the numeral 26, which may contain a power supply, a light, a radio receiver with antenna for remote actuation of operator system 10 in a manner known in the art, and other operational peripherals. The ceiling unit 26 may be electrically interconnected with a wall unit 27 having an up/down button, a light control, and controls for other known functions. The ceiling unit 26 also electrically interconnects with an electric autolatch/unlatch 28 having a locking bar 29 which is extensible through an aperture in one of the tracks T to lock the door D in the closed or other preselected positions. The latch 28 may have a manual control which at least provides for manual unlatching in the event of a power failure.

Referring now to FIGS. 1 and 2 of the drawings, the operator system 10 mechanically interrelates with the door D through a counterbalance system, generally indicated by the numeral 30. As shown, the counterbalance system 30 includes an elongate drive tube 31 extending between tensioning assemblies 32, 32 positioned proximate each of the flag angles 20. While the exemplary counterbalance system 30 depicted herein is advantageously in accordance with U.S. Pat. No. 5,419,010, it will be appreciated by persons skilled in the art that operator system 10 could be employed with a variety of torsion-spring counterbalance systems. In any instance, the counterbalance system 30 includes cable drum mechanisms 33 positioned on the drive tube 31 proximate the ends thereof which rotate with drive tube 31. The cable drum mechanisms 33 each have a cable C reeved thereabout which is affixed to the door D preferably proximate the bottom, such that rotation of the cable drum mechanisms 33 operates to open or close the door D. As seen in FIGS. 1 and 2, the operator system 10 has an operator housing 35 which may conveniently enclose a length of the drive tube 31. While drive tube 31 is depicted as a hollow tubular member that is non-circular in cross-section, it is to be appreciated that circular drive tubes, solid shafts, and other types of driving elements that rotate cable drums, such as cable drum mechanisms 33, may be employed in conjunction with the operator system 10 of the instant invention and are encompassed within this terminology in the context of this specification.

The operator housing 35 has U-shaped slots 36 at either end through which drive tube 31 extends. Operator housing 35 has a mounting plate 37 that may be attached to the header 15 as by a plurality of cap screws 38. While operator housing 35 is shown mounted on drive tube 31 substantially medially between the cable drum mechanisms 33, 33, it is to be noted that with the depicted counterbalance system 30, the operator housing 35 could be mounted at any desired location along drive tube 31 should it be necessary or desirable to avoid an overhead or wall obstruction in a particular garage design.

Figure 3:
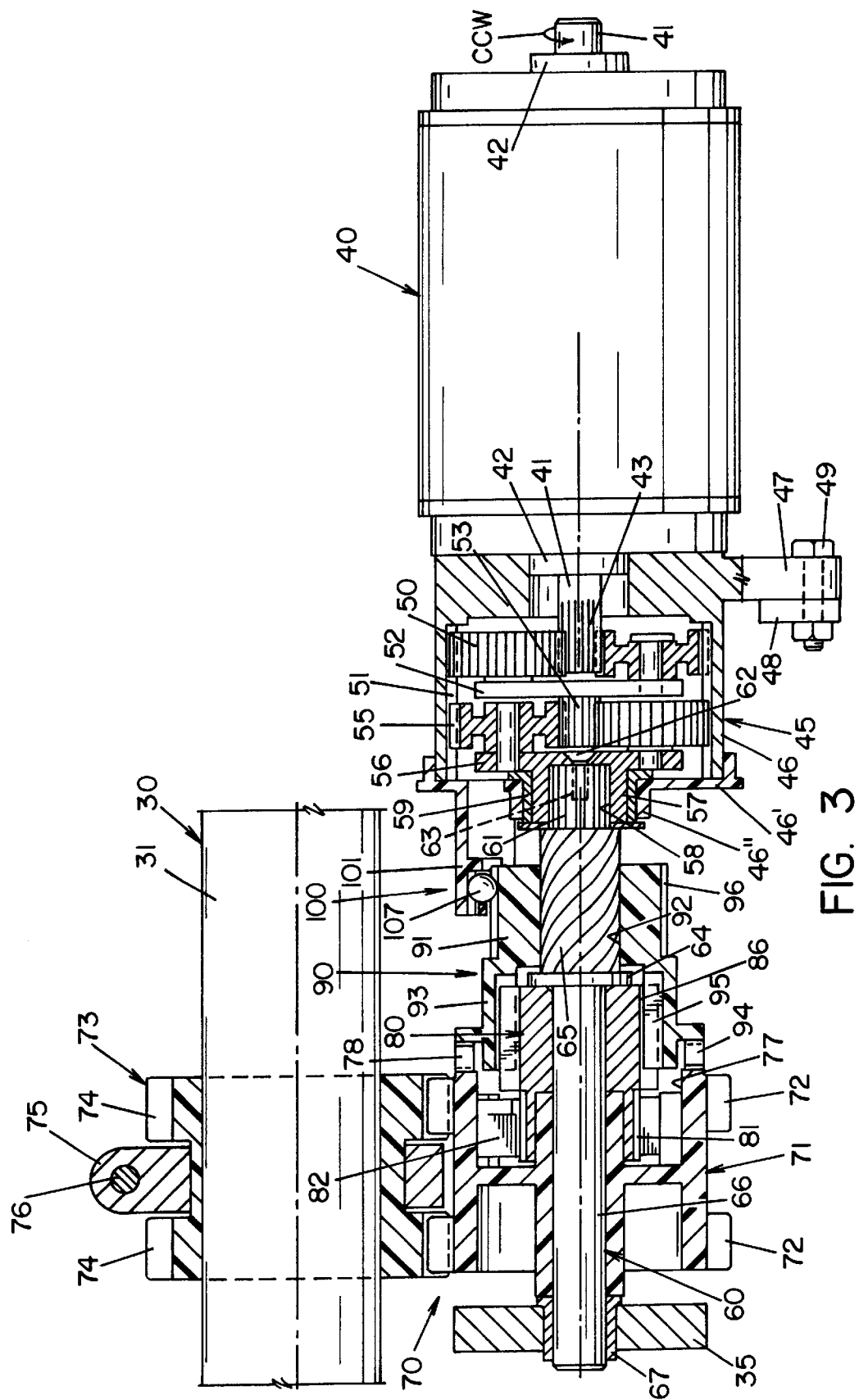
FIG. 3 is an enlarged sectional view through the operator showing a coupler engaging a drive gear which is in engagement with driven gears on the drive tube for moving the door downwardly.
Figure 4:
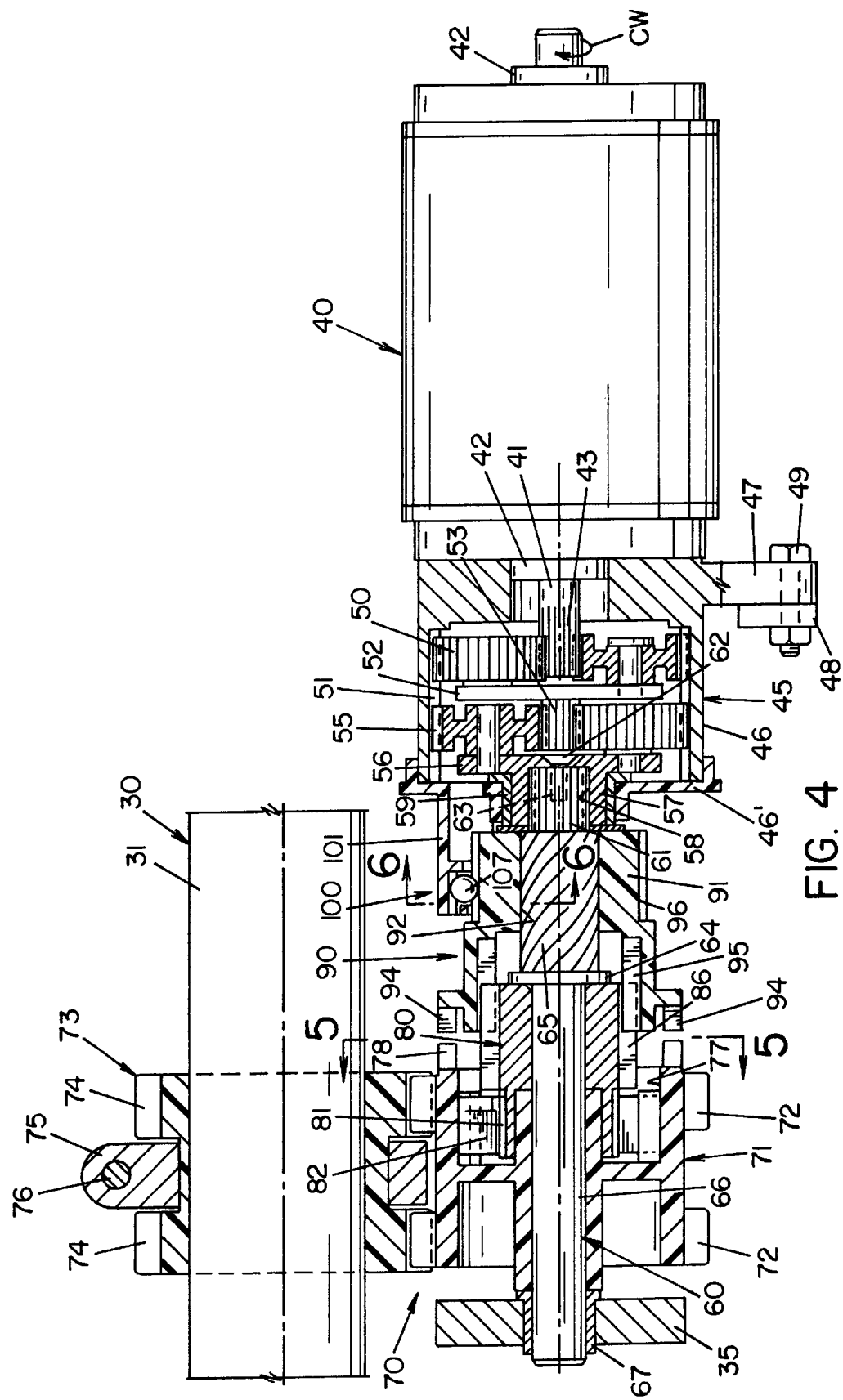
FIG. 4 is a sectional view similar to FIG. 3 showing the coupler retracted from the drive gear with a ratchet wheel and pawls interconnecting the motor and the drive gears to move the door upwardly.
Figure 5:
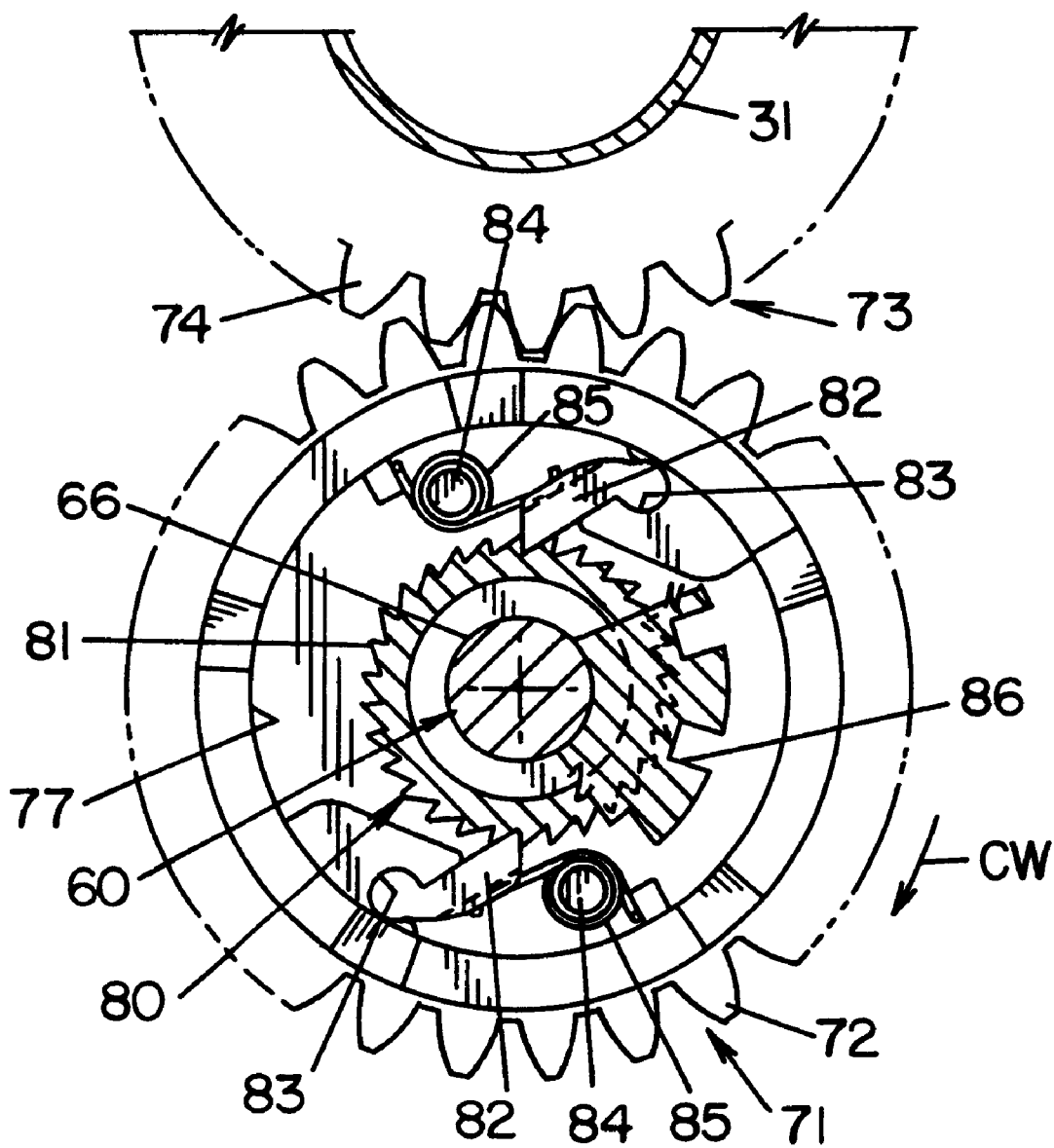
FIG. 5 is a cross-sectional view taken substantially along the line 5—5 of FIG. 4 and showing details of the drive gear, the ratchet, and the spring-loaded pawls.

Positioned within operator housing 35 is an operator motor, generally indicated by the numeral 40, as seen in FIGS. 2–4 of the drawings. The operator motor 40 may be a conventional electric motor that is designed for stop, forward, and reverse rotation of a motor shaft 41, which may be supported in suitable bearings 42. As will be appreciated from the drawings, the motor shaft 41 may substantially parallel the drive tube 31 in close proximity thereto such as to provide a compact configuration within the operator housing 35. With the operator motor 40 positioned below the drive tube 31, none of operator motor 40 and only a small portion of the operator housing 35 extends above the drive tube 31, such that the entire operator system 10 essentially resides below and within the envelope defined by the counterbalance system 30 and the tracks T, T.

In order to achieve an operator motor 40 of minimal dimensions and enhanced power output, and to achieve other efficiencies, the operator motor 40 is coupled to a gear reducer, generally indicated by the numeral 45. The gear reducer 45 has a generally cylindrical housing 46 with projecting ears 47 which may attach to stand-off bracket 48 of operator housing 35 as by fasteners 49 for supporting operator motor 40 and gear reducer 45 in a fixed position within operator housing 35. The axial outer extremity of motor shaft 41 has teeth forming a pinion 43 which operatively engages a first stage planetary gear 50 positioned within gear reducer housing 46 and engaging internal teeth 51 circumferentially located within housing 46. The first stage planetary gear 50 has a first stage gear plate 52 as the output thereof with a projecting output pinion 53. The output pinion 53 drives a second stage planetary gear 55, which may be similar to the first stage planetary gear 50. Second stage planetary gear 55 also engages teeth 51 internally of housing 46 as driven by output pinion 53. The second stage planetary gear 55 has a second stage gear plate 56 constituting the output of second stage planetary gear 55. The second stage gear plate 56 carries an axially-projecting hollow stub shaft 57 which has internal splines 58 for a purpose to be hereinafter detailed.

Figure 10:
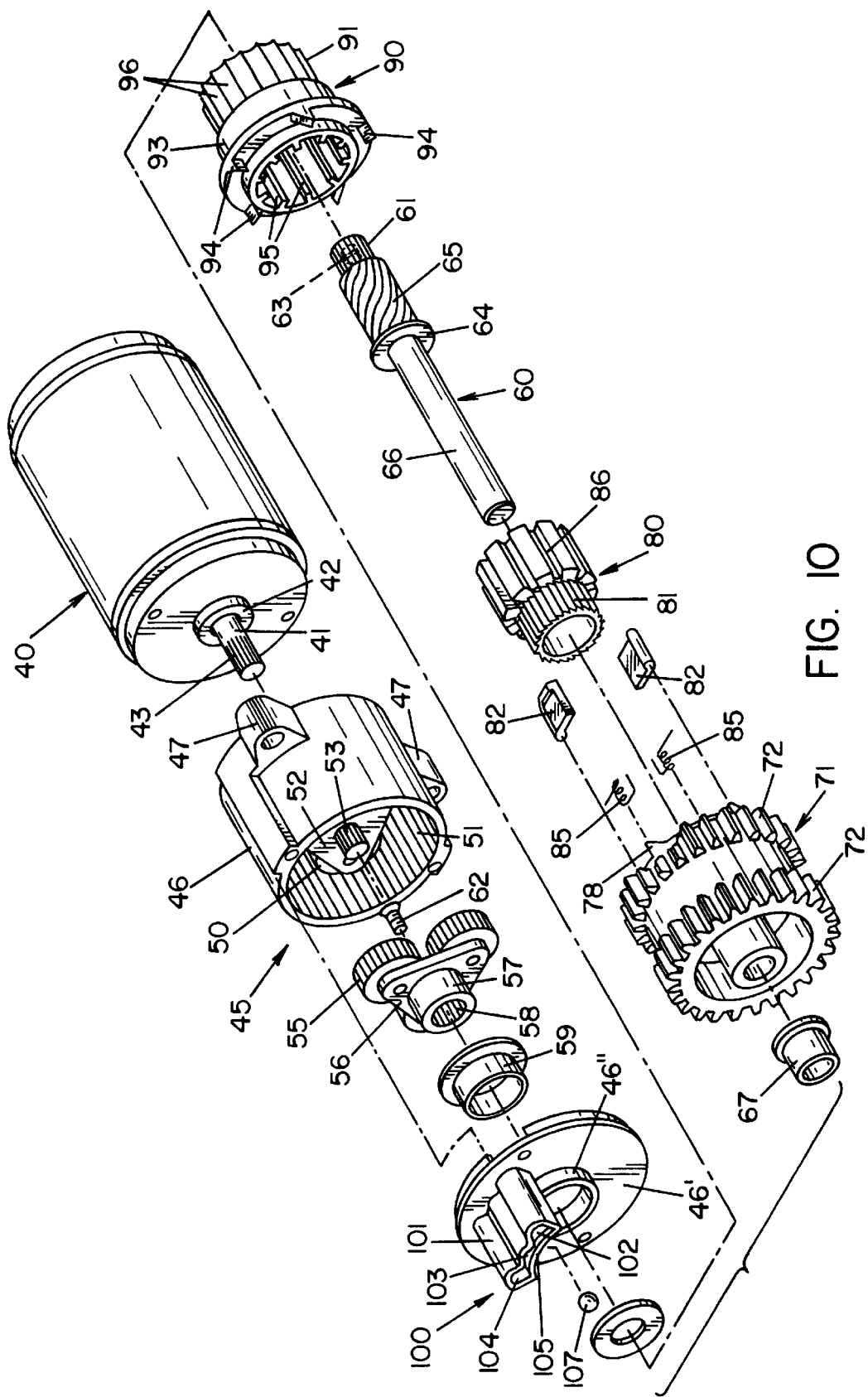
FIG. 10 is an exploded view of the motorized operator depicting details of the various components and the interrelation between the various components.

Further referring to FIGS. 3, 4, and 10, the stub shaft 57 is supported in a bearing 59. The housing 46 has a cover plate 46' with a central annular sleeve 46" which seats a bearing 59 for stub shaft 57. It will thus be appreciated that the stub shaft 57 will produce rotation in the direction of the operator motor 40 at all times, with a greatly reduced angular velocity but vastly increased power capability.

The remainder of the components of the motorized operator system 10 are supported by and are operatively interrelated with a drive shaft, generally indicated by the numeral 60 in FIGS. 3, 4, and 10. The axial extremity of drive shaft 60 proximate gear reducer 45 has external splines 61 adapted to matingly engage the internal splines 58 of stub shaft 57, such that drive shaft 60 rotates with stub shaft 57 at all times. In order to prevent axial displacement of drive shaft 60 relative to gear reducer 45, a set screw 62 extends through second stage gear plate 56 and engages a threaded bore 63 in the axial extremity of drive shaft 60. Spaced a distance from the external spline 61 of drive shaft 60 is a projecting shoulder 64. Positioned between shoulder 64 and external splines 61 on drive shaft 60 are long-pitch lead screw threads 65. The remainder of drive shaft 60 from the shoulder 64 to the end opposite gear reducer 45 is a smooth bearing surface 66. The extremity of drive shaft 60 terminating bearing surface 66 is supported by a bushing 67 positioned in a portion of operator housing 35. The operator system 10 is interconnected with counterbalance system 30 and particularly drive tube 31 thereof by a gear train, generally indicated by the numeral 70, as seen in FIGS. 2, 3, and 4. The gear train 70 includes a drive gear 71 which is freely rotatably mounted on the bearing surface 66 of the drive shaft 60. The drive gear 71 has axially-spaced spur gears 72 about the circumferential periphery thereof. The drive tube 31 of counterbalance system 30 carries a driven gear 73 which is non-relatively rotatably affixed to the drive tube 31 of counterbalance system 30. Driven gear 73 has axially-spaced, circumferentially-continuous spur gears 74 which matingly engage the spur gears 72 of drive gear 71. As best seen in FIGS. 2–4, both the driven gear 73 and drive tube 31 are supported relative to drive shaft 60 by a stand-off bracket 75 which is attached to header 15 as by machine screws 76. It will thus be appreciated that rotation of drive gear 71 in either direction will result in angularly opposite rotation of the driven gear 73 and thus the drive tube 31 of counterbalance system 30 to effect raising and lowering of the door D.

Positioned between drive gear 71 and shoulder 64 of drive shaft 60 is a ratchet wheel, generally indicated by the numeral 80, which powers drive gear 71 in one direction, as is hereinafter detailed. As best seen in FIGS. 3, 4, 5, and 10, the ratchet wheel 80 is freely rotatably mounted on bearing surface 66 of drive shaft 60. The axial portion of ratchet wheel 80 proximate to gear train 70 extends into a cylindrical recess 77 in drive gear 71 and has ratchet teeth 81 about the outer surface thereof. The ratchet teeth 81 cooperatively interrelate with two or more pawls 82 positioned in precut slots 83 which permit limited rotation of pawls 82 axially inwardly and outwardly of drive gear 71. Cylindrical recess 77 of drive gear 71 has projecting pins 84 that position coil springs 85 to bias the pawls 82 radially inwardly at all times into engagement with the ratchet teeth 81 of ratchet wheel 80. It will thus be appreciated that clockwise rotation of ratchet wheel 80, as indicated by an arrow and CW in FIGS. 2–5, will result in drive gear 71 being driven to also effect rotation of driven gear 73 and drive tube 31. Rotation of ratchet wheel 80 in a counterclockwise direction will not rotate drive gear 71, as the pawls 82 merely freewheel by the ratchet teeth 81.

Interposed between ratchet wheel 80 and gear reducer 45 is a coupler, generally indicated by the numeral 90. As particularly seen in FIGS. 2–4 and 10, the coupler 90 has a boss 91 with long-pitch lead screw threads 92 on an internal bore which matingly engage the lead screw threads 65 of drive shaft 60. It will thus be appreciated that counterclockwise rotation of drive shaft 60 enables movement of coupler 90 from the position depicted in FIG. 4 with boss 91 engaging gear reducer 45 to the position depicted in FIG. 3 with boss 91 proximate shoulder 64 of drive shaft 60. Clockwise rotation of drive shaft 60 produces opposite movement of coupler 90, that is, from the position depicted in FIG. 3 axially of drive shaft 60 to the position depicted in FIG. 4.

Coupler 90 has an annular projection 93 extending from boss 91 of coupler 90, which interacts with ratchet wheel 80 and drive gear 71. The annular projection 93 has axially-extending teeth 94 (FIGS. 4 and 10) which selectively engage mating axially-extending teeth 78 (FIGS. 3 and 10) on the drive gear 71. As shown, each of the coupler 90 and drive gear 71 have five equiangularly-spaced, axially-extending teeth 94 and 78, respectively, providing driving interrelation of drive gear 71 by drive shaft 60. It is thus to be appreciated that drive shaft 60 powers drive gear 71 upon counterclockwise rotation of operator motor 40 when teeth 94 and 78 are interengaged in the FIG. 3 position of coupler 90. With coupler 90 in the FIG. 4 position, the teeth 94 and 78 are separated, as seen in FIG. 4, such that this drive path is not extant.

While the coupler 90 is axially movable relative to ratchet wheel 80 and drive gear 71, as above-described, the ratchet wheel 80 rotates at all times with coupler 90 in both directions as it is driven by drive shaft 60 and operator motor 40. In this respect, annular projection 93 of coupler 90 has radially inwardly-projecting splines 95 (FIGS. 4 and 10) which interengage axial slots 86 (FIG. 10) in the outer surface of ratchet wheel 80. Both the splines 95 and the axial slots 86 are of a sufficient axial extent such as to remain in engagement during the entire extent of axial movement of coupler 90 relative to the fixed ratchet wheel 80.

Figure 9:
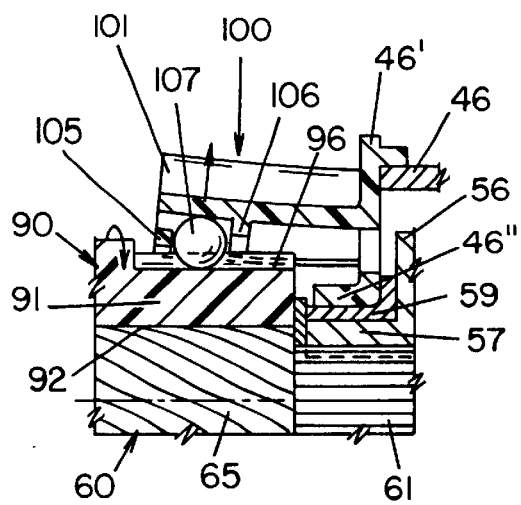
FIG. 9 is a cross-sectional view taken substantially along the line 9—9 of FIG. 8 and showing deflection of the cantilever arm elements during transition of the locking ball between the recesses.

Upon reversal of the direction of rotation of drive shaft 60, as controlled by operator motor 40, initial axial movement of coupler 90 along drive shaft 60 is insured by virtue of a rotation resistance assembly, generally indicated by the numeral 100. Referring particularly to FIGS. 3–10, the rotation resistance assembly has an arcuate cantilever arm 101 that extends axially outwardly of and is rigidly attached to gear reducer housing cover plate 46'. The arcuate cantilever arm 101 is internally configured to form three angularly disposed recesses 102, 103, and 104. The recesses 102, 103, and 104 are axially closed by an end wall 105 and an intermediate wall 106 projecting radially inwardly from the cantilever arm 101 (see FIG. 9). Retained or captured within recesses 102, 103, and 104 between end wall 105 and intermediate wall 106 is a locking ball 107, which is selectively movable between the recesses 102, 103, and 104 in a manner hereinafter described. Rotation resistance assembly 100 includes axially-extending grooves 96 formed in the outer surface of the boss 91 of coupler 90. As seen, the grooves 96 may constitute a segment of a circle having a radius substantially equal to the radius of locking ball 107. The grooves 96 extend a sufficient distance axially of boss 91 of coupler 90, such that locking ball 107 remains in one or more grooves 96 positioned circumferentially about boss 91 during the entire axial travel of coupler 90 between the positions depicted in FIGS. 3 and 4. As seen in FIG. 9, the cantilever arm 101 is capable of sufficient radial outward deflection (FIG. 9) to permit movement of locking ball 107 between recesses 102, 103, 104 in a prescribed manner hereinafter described during the operational cycle of operator system 10.

While the operation of motorized operator system 10 is largely self-explanatory from the above description, an operating cycle proceeds essentially in the following manner. The door D is driven downwardly toward the closed position, with the teeth 94 of coupler 90 in contact with axially-extending teeth 78 of drive gear 71 in the position depicted in FIG. 3, with operator motor 40 rotating counterclockwise pursuant the directions of rotation established in FIGS. 2–4. Power to the motor 40 is discontinued when the door D reaches the down or closed condition as by a signal from a limit switch or other sensor in a manner well known to persons skilled in the art. Operator motor 40 is then rotated in a clockwise direction for a short interval to retract the coupler 90 from engagement with the drive gear 71, which is the position depicted in FIG. 4. During counterclockwise rotation of motor 40 during descent of door D, the locking ball 107 has moved radially freely in recess 102 as coupler 90 has moved in a direction opposite to the arrow indicated in FIG. 6 of the drawings.

Figure 6:
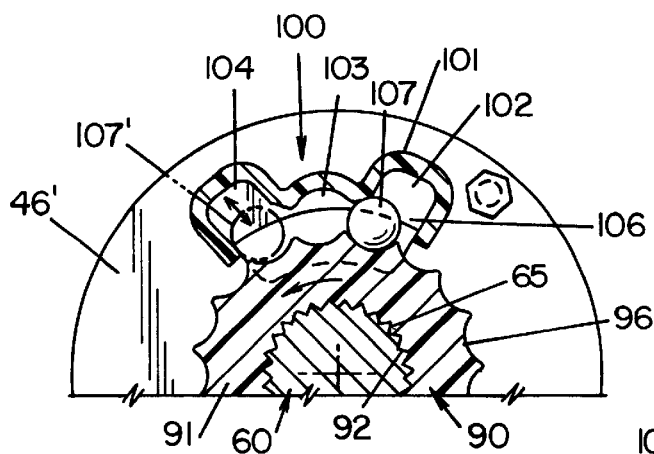
FIG. 6 is a cross-sectional view taken substantially along the line 6—6 of FIG. 4 and showing details of the rotation resistance assembly and particularly the position of the locking ball between the axial grooves on the coupler and the cantilever arm recesses during commencement of upward drive of the door.

The commencement of clockwise rotation of motor 40, which is reflected by rotation of coupler 90 in the direction of the arrow in FIG. 6, moves the locking ball 107 to the solid-line position depicted in FIG. 6. The locking ball 107, by virtue of its engagement with the fixed cantilever arm 101 of rotation resistance assembly 100, applies a finite amount of resistance to rotation of coupler 90 via engagement with the grooves 96 of coupler 90. Since free rotation of coupler 90 is temporarily prevented by locking ball 107, axial motion of the coupler 90 from the position depicted in FIG. 3 to the position depicted in FIG. 4 is induced due to the long-pitch lead screw threads 92 engaging the lead screw threads 65 of drive shaft 60. Since only minimal resistance is required to effect the axial movement of coupler 90, that motion is normally completed with locking ball 107 in the solid-line position of FIG. 6. As soon as coupler 90 reaches the axial position depicted in FIG. 4 and is stopped by engagement with gear reducer 45, rotation of coupler 90 in the direction of the arrow in FIG. 6 commences whereupon locking ball 107 moves from the solid-line position of FIG. 6 to the chain-line position 107' in a few degrees of rotation of coupler 90 by overcoming the biasing resistance of cantilever arm 101. After this brief clockwise rotation of motor 40, the motor 40 is stopped and remains with coupler 90 disengaged from drive gear 71. Depending upon door size and other considerations, a latch 28 may be energized before or after the clockwise rotation of motor 40 just described to lock door D in the closed or other selected position.

When it is desired to open or raise the door D from the closed to the open position, latch 28, if employed, is retracted or released to free the door D for upward movement. The motor 40 then resumes clockwise rotation, with the coupler 90 in the retracted position depicted in FIG. 4 of the drawings. In this position, the drive shaft 60 rotates coupler 90 which through splines 95 thereof engaging axial slots 86, rotates ratchet wheel 80. Ratchet teeth 81 of ratchet wheel 80 engage the pawls 82 of drive gear 71 to rotate driven gear 73 and drive tube 31 in a manner to wind the cables C to raise the door to the open position. Operator motor 40 continues to drive until power is removed from the motor 40 when a limit switch or other sensor indicates that the door D has reached the open position. The door D remains in the open position, with the coupler 90 remaining in the retracted position relative to the drive gear 71, as depicted in FIG. 4. During the drive of the door D from the closed to the open position, the locking ball 107 remains in the chain-line position 107' of FIG. 6, with coupler 90 rotating in the direction of the arrow in FIG. 6 and with the locking ball 107 freely radially oscillating in recess 104 while remaining captured within cantilever arm 101.

Figure 7:
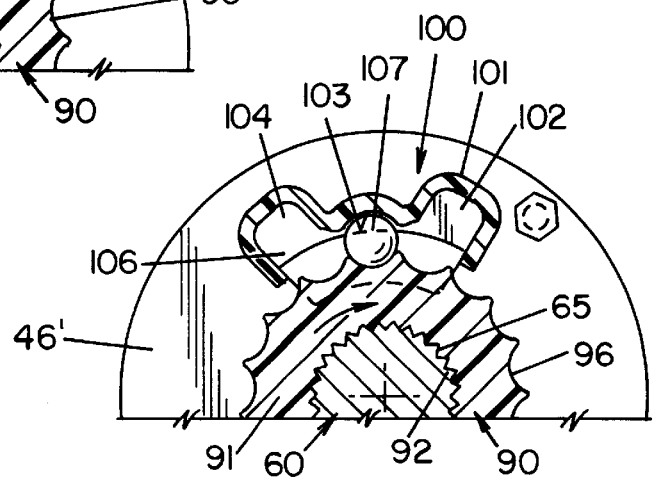
FIG. 7 is a sectional view similar to FIG. 6 showing the locking ball displaced to a medial recess in the cantilever arm which may take place at commencement of downward drive of the door.
Figure 8:
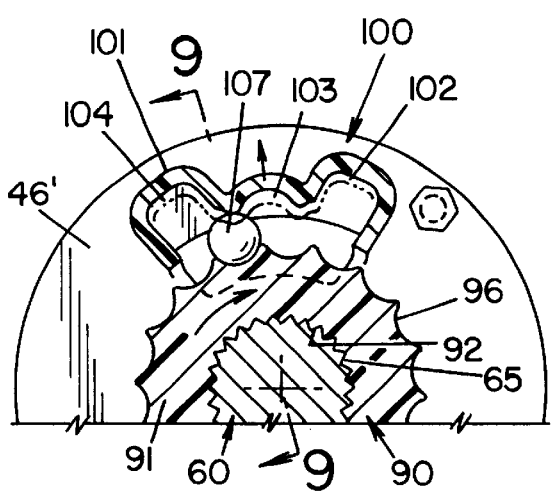
FIG. 8 is a cross-sectional view similar to FIGS. 6 and 7 showing the locking ball position relative to the cantilever arm recesses at the commencement of downward drive of the door.

When it is desired to actuate the door D to move from the open to the closed position, operator motor 40 is rotated in a counterclockwise direction. The drive shaft 60 commences drive of coupler 90 in the direction depicted in FIG. 8 of the drawings, with the locking ball 107 moving to the position depicted in FIG. 8. In operation, which is the reverse of that described in conjunction with FIG. 6, locking ball 107 applies rotational resistance to coupler 90 so that axial motion of coupler 90 is induced to move it from the retracted position of FIG. 4 to the position of FIG. 3 where the teeth 94 of coupler 90 engage the teeth 78 of the drive gear 71. Once this axial translation of coupler 90 is completed, continued counterclockwise rotation of motor 40 immediately transfers locking ball 107 from recess 104 to recess 102, thereby constituting a reversal of the sequence described in conjunction with FIG. 6. In the event, however, that full axial motion of the coupler 90 is impeded by the teeth 94 engaging the teeth 78 of drive gear 71, the locking ball 107 would be rotated only to the intermediate position of recess 103, as depicted in FIG. 7. Since the coupler 90 has rotated to a new position relative to drive gear 71, the teeth 94 and 78 cannot be in an interfering position. Thus, continued counterclockwise rotation of coupler 90 will complete axial travel of coupler 90, at which time locking ball 107 moves from recess 103 to recess 102. Continued counterclockwise rotation of coupler 90 by motor 40 produces direct drive of the drive gear 71 by coupler 90 through teeth 94 and 78. The locking ball 107 thereafter radially oscillates in recess 102 as the door D is lowered to the closed position to thus complete the operating cycle.

It is to be appreciated that the coupler 90 is retracted from the drive gear 71 at the conclusion of each drive sequence and during movement of the door D from the closed to the open position. Thus, should the door D encounter a person or object during the closing motion, the door D may be readily manually lifted with assistance from the counterbalance system 30 once the coupler 90 is retracted. In this instance, the drive gear 71 will freely rotate clockwise, with the pawls 82 freely passing over the ratchet teeth 81 on ratchet wheel 80 with essentially no resistance. From such a stopped position, the door D can be pulled down, causing counterclockwise rotation of the drive gear 71, such that the pawls 82 operatively engage the ratchet teeth 81, thereby driving coupler 90, drive shaft 60, gear reducer 45, and motor 40 against the resistance afforded by permanent magnets in the motor 40, which permit downward, manual movement of door D but with a resistance sufficient to obviate a free-fall condition.

Thus, it should be evident that the motorized operator for doors disclosed herein carries out various of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention being limited solely by the scope of the attached claims.

What is claimed is:

1. An operating system for controllably moving a sectional door between open and closed positions in relation to a door frame having a pair of jambs and an interconnecting header, the operating system comprising, a counterbalancing system having a drive tube adapted to be interconnected with the sectional door proximate the ends thereof, a reversible operator motor mounted adjacent to said drive tube; a gear reducer driven by said operator; a drive shaft driven by said gear reducer; a drive train interconnecting said drive tube and said operator motor for selectively driving the drive tube for moving the sectional door between open and closed positions; said drive train including a pair of axially spaced drive gears freely rotatably mounted on said drive shaft and a pair of axially spaced driven gears nonrelatively rotatably mounted on said drive tube and continually engaging said pair of drive gears; an operator housing enclosing a portion of said drive tube, said operator motor, said gear reducer, said drive shaft and said drive train; and a coupler on said drive shaft retractable from a driving position when the sectional door is stopped, whereby the sectional door may be manually moved toward either of the open position and the closed position, said gear reducer including first and second planetary gears.

2. An operating system according to claim 1, wherein said counterbalancing system has cable drum mechanisms mounted on said drive tube and cables reeved about each of said cable drum mechanisms and adapted to be attached to the sectional door.

3. An operating system according to claim 2, wherein said drive tube is non-circular in cross-section.

4. An operating system according to claim 2, wherein said operator housing is located between said cable drum mechanisms and below said drive tube.

5. An operating system according to claim 1, wherein said drive shaft is mounted substantially parallel to said drive tube.

6. An operating system according to claim 1, wherein a gear reducer is interconnected between said operator motor and said drive shaft.

7. An operating system according to claim 1 wherein said operator motor is positioned between said drive tube and said sectional door.

8. An operating system according to claim 1, wherein said coupler is movable axially of said drive shaft.

9. An operating system according to claim 1, wherein said drive gears and said driven gears are spur gears.

\* \* \* \* \*